United States Patent [19]

Perkins et al.

[11] Patent Number: 5,309,062

[45] Date of Patent: May 3, 1994

[54] THREE-WAY COMPACT FLUORESCENT LAMP SYSTEM UTILIZING AN ELECTRONIC BALLAST HAVING A VARIABLE FREQUENCY OSCILLATOR

[75] Inventors: Rick A. Perkins; Brian P. Geary, both of Holland, Mich.

[73] Assignee: Progressive Technology in Lighting, Inc., Holland, Mich.

[21] Appl. No.: 886,507

[22] Filed: May 20, 1992

[51] Int. Cl.$^5$ .............................. H01J 7/44
[52] U.S. Cl. .................... 315/53; 315/DIG. 7; 315/58; 315/307; 315/DIG. 4; 315/294; 315/362
[58] Field of Search ............ 315/184, 35, 70, 71, 315/58, 53, 56, DIG. 7, 291, 307, DIG. 4, 294, 362; 40/246

[56] References Cited

U.S. PATENT DOCUMENTS

| | | | |
|---|---|---|---|
| 2,139,815 | 12/1938 | Fodor | 40/246 |
| 2,765,428 | 10/1956 | Campbell | 315/283 |
| 4,060,752 | 11/1977 | Walker | 315/244 |
| 4,277,726 | 7/1981 | Burke | 315/98 |
| 4,284,925 | 8/1981 | Bessone et al. | 315/DIG. 4 |
| 4,438,372 | 3/1984 | Zuchtriegel | 315/283 |
| 4,469,988 | 9/1984 | Cronin | 315/209 R |
| 4,496,878 | 1/1985 | Nilssen | 315/56 |
| 4,538,093 | 8/1985 | Melai | 315/219 |
| 4,553,070 | 11/1985 | Sairanen et al. | 315/DIG. 7 |
| 4,704,561 | 11/1987 | Dietl | 315/219 |
| 4,723,200 | 2/1988 | Troen | 315/71 |
| 4,748,368 | 5/1988 | Wilson et al. | 315/184 |
| 4,958,102 | 9/1990 | Wilson et al. | 315/184 |

FOREIGN PATENT DOCUMENTS 0103758 6/1983 Japan .................... 315/71

Primary Examiner—Robert J. Pascal
Assistant Examiner—Michael B. Shingleton
Attorney, Agent, or Firm—Price, Heneveld, Cooper, De Witt & Litton

[57] ABSTRACT

A compact low-pressure gas discharge lamp assembly includes a base and a plurality of low-pressure gas discharge light generating elements mounted to the base. Each of the light generating elements is capable of being individually energized. A ballast circuit is provided which is capable of supplying electrical energy to a variable number of the low pressure gas discharge lighting elements. A three-way switch has an input connected with the ballast circuit and two outputs. Each output is connected with a different light generating element. The switch connects one of the outputs with the ballast circuit in a first switch position and another one of the outputs with the ballast circuit in a second switch position. Both of the outputs are connected with the ballast circuit in a third switch position. The ballast circuit includes an oscillator that oscillates at a frequency that varies as a function of the number of light generating elements connected by the switch to the ballast circuit.

12 Claims, 3 Drawing Sheets

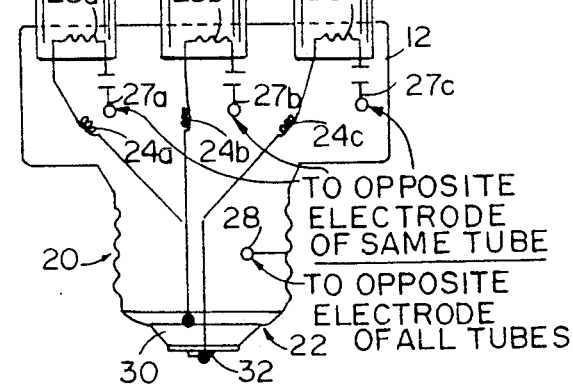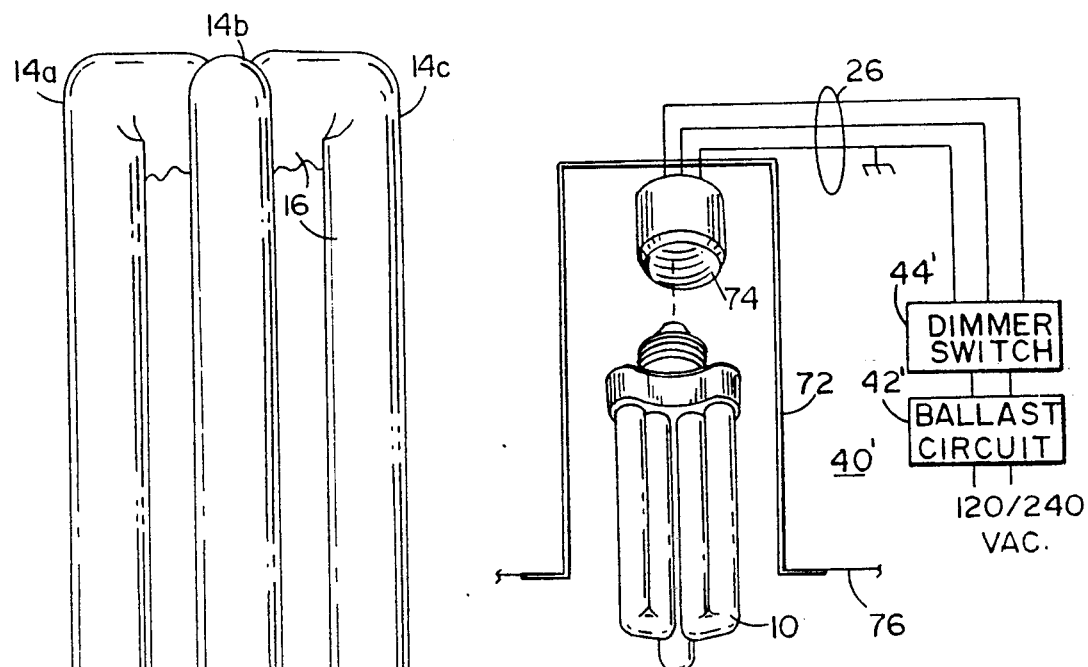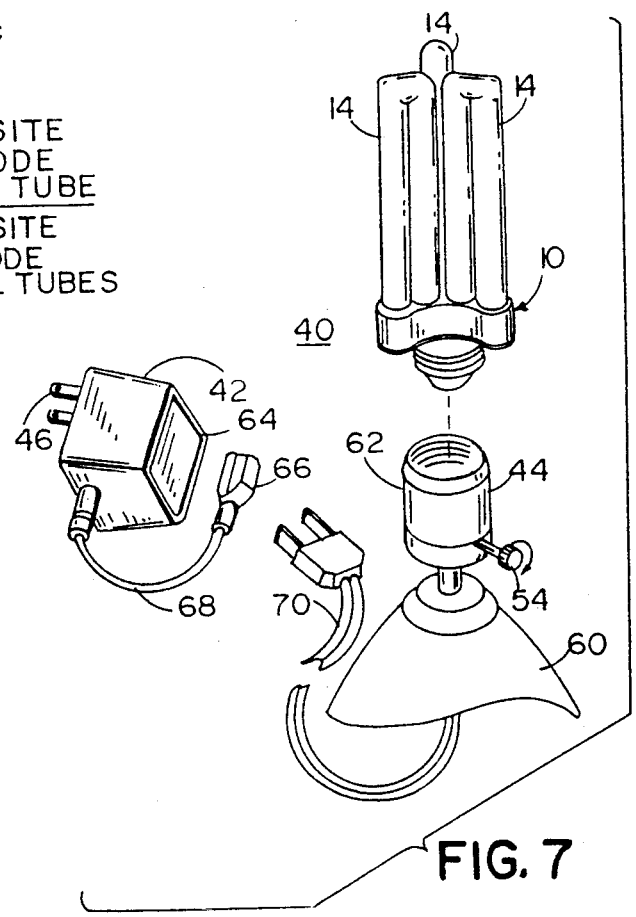

THREE-WAY COMPACT FLUORESCENT LAMP SYSTEM UTILIZING AN ELECTRONIC BALLAST HAVING A VARIABLE FREQUENCY OSCILLATOR

BACKGROUND OF THE INVENTION

This invention relates to compact low-pressure gas discharge lamps and more particularly to a system including a lamp assembly and a power supply for the lamp assembly. The invention is especially adapted to providing practical dimming capabilities for compact fluorescent lamps.

Compact fluorescent lamps have long been known for their high luminous efficiency and have made great strides in replacing relatively inefficient incandescent bulbs. Because fluorescent lamps are typically provided in elongated tubular form, efforts have been made to reconfigure their light transmitting enclosures into a series of short parallel tubes or stubs. Prior attempts have focused on reforming the light transmitting enclosure of a single gas discharge lamp into a serpentine configuration, such as illustrated in U.S. Pat. No. 4,347,460, or into a series of cross coupled tubes as illustrated in U.S. Pat. No. 4,545,774. Such prior attempts have resulted in lamps that could be manufactured only by extremely complex manufacturing processees.

There has been a long felt yet unmet need for practical dimming capabilities for compact fluorescent lamps. While various schemes have been proposed, none of them have been commercially acceptable. This is believed to be a result of the unusual and demanding operating characteristics of such compact fluorescent lamps. Dimming techniques that are suitable for incandescent lamps are incompatible with fluorescent lamp circuits.

Because the primary benefit of compact fluorescent lamps is envisioned to be in the replacement of incandescent lamps, compact fluorescent lamp adapters have been used for the purposes of adapting conventional incandescent lamp fixtures for use with compact fluorescent lamps. This not only avoids unnecessary expense in equipment replacement but allows the substitution to be easily performed by the end user. Such adapters have not been without their drawbacks. Compact fluorescent lamps are heat sensitive, and the waste heat produced by the lamp ballast circuit tends to reduce lamp longevity when combined in the same assembly with the fluorescent lamp.

SUMMARY OF THE INVENTION

The present invention provides a unique compact low-pressure gas discharge lamp assembly having a base and a plurality of low-pressure gas discharge light generating elements mounted to the base. Each of the light generating elements are capable of being individually energized. Supply means are provided with the base for conducting electrical energy to each of the light generating elements. This allows conventional U-shaped and H-shaped compact fluorescent lamps, for which manufacturing capacity if readily available, to be assembled into a lamp assembly without undue manufacturing complexity. Additionally, if a light generating element fails, the remaining elements of the lamp assembly continue to generate light so that the lamp assembly may continue to be useful while awaiting replacement.

According to another aspect of the invention, a ballast circuit is provided that is adapted to supplying electrical energy to a selective number of such light generating elements of the lamp assembly. A switch assembly may be provided that is adapted to connecting the ballast circuit selectively to particular ones of the light generating elements. This provides dimming capabilities to the system by providing selective operation of different numbers of light emitting elements.

According to another aspect, the present invention is especially adapted to providing such dimming capabilities to conventional incandescent lamp fixtures having a three-way switch and socket. Such fixtures are provided for use with incandescent lamps having a high intensity filament and a low intensity filament connected with separate contacts in the lamp base. The three-way switch provides energy to the low intensity filament for a low-light output, to the high intensity filament for a medium-light output and to both filaments for a high-light output. According to this aspect of the invention, a lamp assembly having a plurality of compact gas discharge light generating elements that are capable of being individually energized, are connected with the three-way switch such that one of the light generating elements is energized in a first switch position, two other light generating elements are energized in a medium switch position and all light generating elements are energized in a third, or high, switch position.

This aspect of the invention is especially advantageous because it provides dimming capability, not previously available in a compact fluorescent light system, utilizing readily available incandescent light fixtures. In a disclosed embodiment, the ballast circuit is provided in a module which may be plugged into a conventional wall outlet and is adapted to receiving the plug of a conventional table lamp. This provides dimming capabilities with the three-way switch in a conventional table lamp with the gas discharge lamp assembly being threaded into the conventional three-way socket of such table lamp. Advantageously, this aspect of the invention further allows, for the first time, dimming capabilities of compact fluorescent lamps used in permanently installed recessed lighting and track lighting fixtures.

These and other objects, advantages and features of this invention will become apparent upon review of the following specification in conjunction with the drawings.

BRIEF DESCRIPTION OF THE DRAWINGS

FIG. 4 is a rear elevation of the lamp assembly in FIG. 1 with a portion of the base removed to reveal internal structure thereof;

FIG. 7 is a perspective view of a lamp system according to the invention; and

FIG. 8 is a partial perspective view and partial electrical schematic diagram of an alternative embodiment of a lamp system according to the invention.

DESCRIPTION OF THE PREFERRED EMBODIMENT

Figure 1:
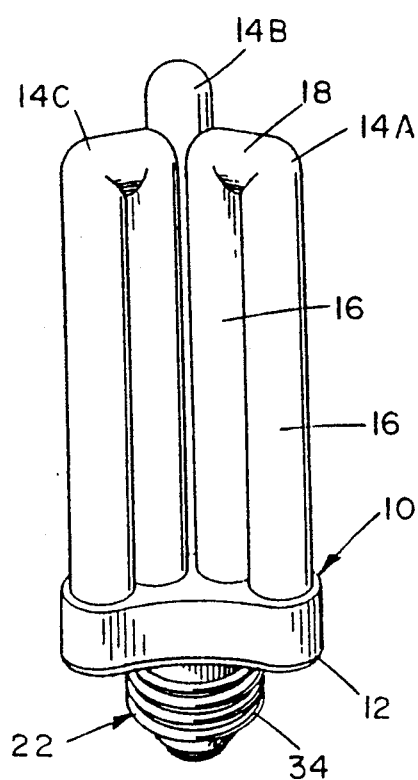
FIG. 1 is a front perspective view of a lamp assembly according to the invention.
Figure 2:
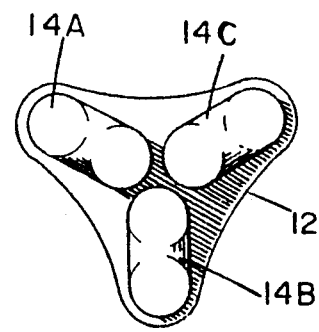
FIG. 2 is a top plan view of the lamp assembly in FIG. 1.
Figure 3:
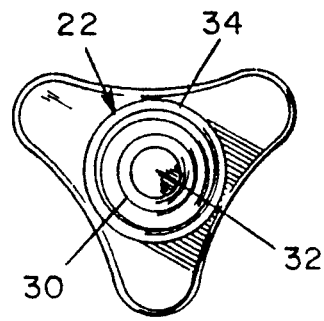
FIG. 3 is a bottom plan view of the lamp assembly in FIG. 1.
Figure 6:
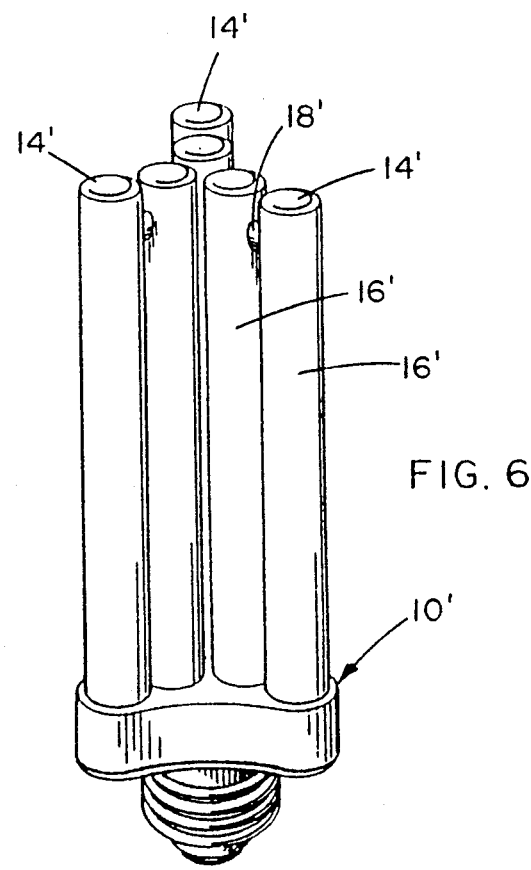
FIG. 6 is the same view as FIG. 1 of an alternative embodiment of a lamp assembly according to the invention.

Referring now specifically to the drawings, and the illustrative embodiments depicted therein, a low-pressure gas discharge lamp assembly 10 includes a base 12 and a plurality of individual low-pressure gas discharge light emitting elements 14a–14c extending from base 12 (FIGS. 1-3). Light emitting elements 14a–14c contain mercury vapor at low-pressure with a small amount of inert gas for generating ultraviolet energy to activate fluorescent powders. Such lamps are commonly referred to as compact fluorescent lamps. Light emitting elements 14 are conventional U-shaped compact fluorescent lamps having a pair of parallel shafts 16 joined together at a bite portion 18. Alternatively, light emitting elements 14' may be used that are of a conventional H-shaped configuration include a pair of tubes 16' joined with a stub 18' (FIG. 6).

Figure 5:
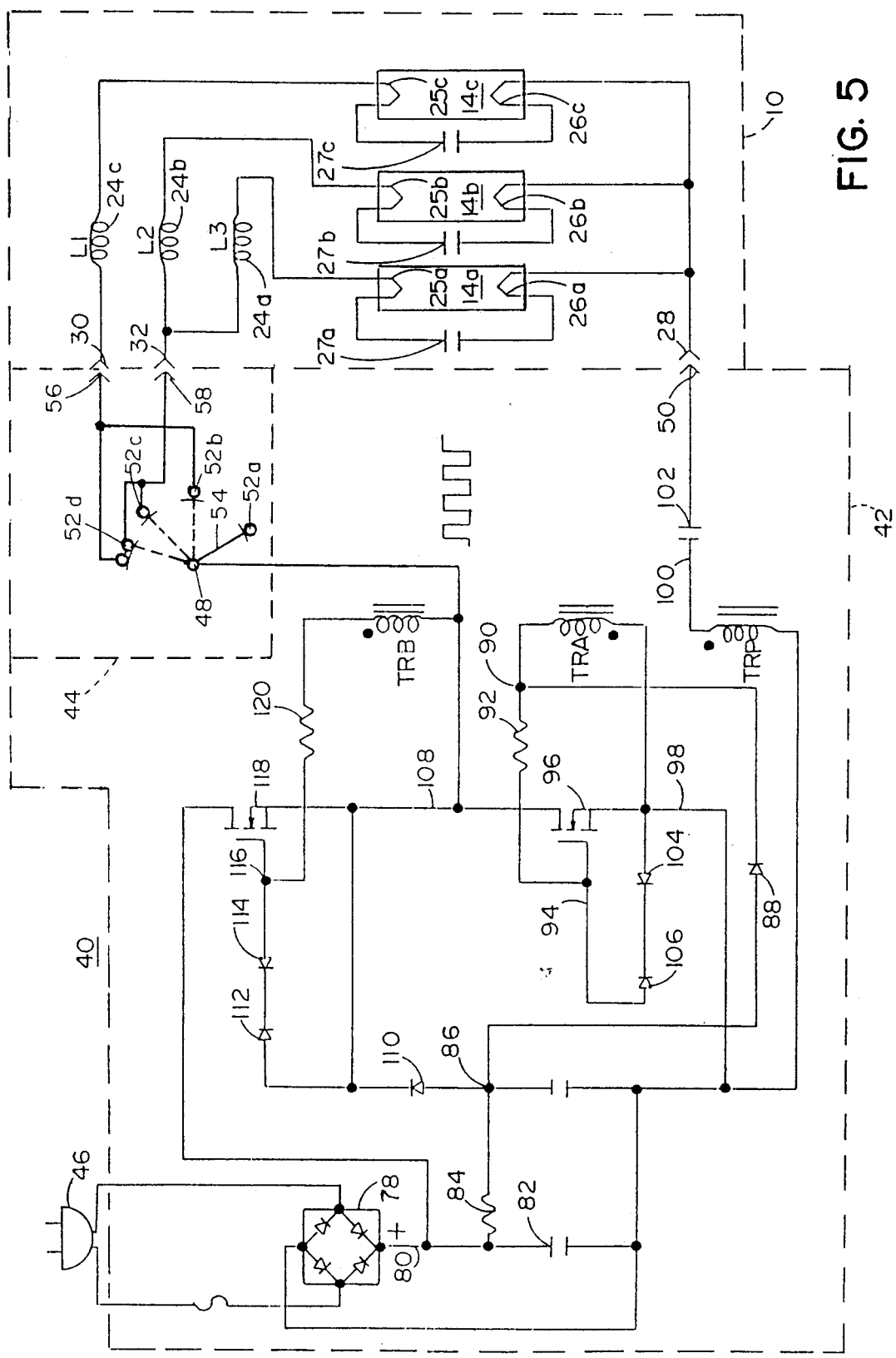
FIG. 5 is an electrical schematic diagram of a lamp system according to the invention.

Tubes 16 of all light emitting elements 14 terminate within base 12 (FIG. 4). Only one tube 16 for each light emitting element 14 is shown in FIG. 4 for clarity. Supply means for conducting electrical energy to each of the light emitting elements 14a–14c, generally shown at 20, includes a contact assembly 22 and a plurality of inductive devices 24 interconnecting the contact assembly with light emitting elements 14. Inductive devices 24a–24c are electrically interconnected between a contact assembly 22 and cathodes 25a–25c of one tube 16 of light emitting elements 14a–14c. Each cathode 25a–25c is electrically series connected with a capacitor and the respective cathodes 26a–26c of the other tube 16 of the same light emitting element. Other electrodes 26a–26c are, in turn, joined together and connected with a common contact 28 of contact assembly 22 as seen in FIG. 5. Contact assembly 22 includes a contact 30 to which inductive devices 24a and 24b are electrically connected and a contact 32 to which inductive device 24c is electrically connected. In the illustrative embodiment, contact assembly 22 is a conventional three-way incandescent lamp base in which contact 28 is electrically common with the metallic threads 34 of the screw-base and contacts 30 and 32 are concentric contacts mounted at the end of contact assembly 22 axially outward of threads 34. As will be --et forth in more detail below, when a suitable electrical potential is applied across contacts 32 and 28, light emitting element 14c connected with inductive device 24c will illuminate and emit light. When a suitable electrical potential is applied across contacts 30 and 28, light emitting element 14a connected with inductive device 24a and light emitting element 14b connected with inductive device 24b will illuminate. When a suitable electrical potential is applied across contacts 30 and 28 and across contacts 32 and 28, all light emitting elements 14a–14c will illuminate and emit light.

Lamp assembly 10 is supplied with electrical energy in a lamp system 40 including a ballast circuit 42 and, preferably, a switch assembly 44 (FIG. 5). Ballast circuit 42 includes a pair of input terminals 46, which are illustrated as a conventional plug, for interconnection with a high voltage AC power source, such as a house wall outlet. Ballast circuit 42 produces an output across output contacts 48 and 50. Output contact 48 is connected with switch assembly 44 which, in the illustrated embodiment, is a conventional three-way switch having switch elements 52a, 52b, 52c and 52d that are separately, selectively actuated by an actuator 54. Switch assembly 44 includes a first output contact 56 that is electrically connected with contact 30 of lamp assembly 10 and a second output contact 58 that is electrically connected with contact 32 of lamp assembly 10. As is conventional, all elements 52a–52d are open when actuator 54 of switch assembly 44 is in an off position. When actuator 54 is rotated to a first, or low-light position, only switch element 52a closes. When actuator 54 is rotated from the first to a second, or medium-light output position, element 52a opens and element 52b closes. When actuator 54 is further rotated to a third, or high-light output position, element 52b opens and elements 52c and 52d close. In this manner, output 48 of ballast circuit 42 is electrically connected with contact 3 of lamp assembly 10 when actuator 54 is rotated to the first low-light position in order to illuminate light emitting element 14c. Ballast circuit output 48 is connected with contact 32 of lamp assembly 10, when actuator 54 is rotated to a medium light position and, thereby, energizes light emitting elements 14a and 14b but not 14c. Ballast circuit output 48 is applied to both contacts 30 and 32 of lamp assembly 10 when actuator 54 is rotated to a high output position and, thereby, illuminates all light emitting below, ballast circuit 42 in combination with lamp assembly 10 is adapted to supplying substantially a suitable current to each light emitting elements 14a–14c irrespective of the number of elements that are interconnected by switch assembly 14 with the ballast circuit.

In one form of the present invention, lamp system 40 includes a conventional incandescent lamp fixture 60 having a three-way switch and socket assembly 62 (FIG. 7). In lamp system 40 illustrated in FIG. 7, ballast circuit 42 is enclosed within a housing 64 with supply voltage contacts 46 extending from a wall of the housing 64. A molded receptacle 66 interconnected with housing 64 by a cable 68 includes output contacts 48 and 50 of the ballast circuit. In this manner, the contacts 48 and 50 of the ballast circuit are interconnected with switch 44 through the plug and cord assembly 70 of lamp fixture 60. Accordingly, conventional three-way lamp fixture 60 may be adapted to use with lamp system 40 by inserting ballast circuit module 42 into a conventional wall outlet and interconnecting the plug of cord 70 with receptacle 66. Lamp assembly 10 is conveniently threaded into the three-way socket of switch and socket assembly 62. As set forth in more detail above, as actuator 54 is rotated from an off through low, medium and high light output positions, a first light emitting element 14a–14c is illuminated in the first position, two light emitting elements 14a–14c are illuminated in the medium position and all three light emitting elements 14a–14c are illuminated in the high light output position.

The present invention is additionally useful in providing dimming capabilities for compact fluorescent lamps in a recessed lamp system 14' (FIG. 8). Lamp system 40' includes a recessed light fixture 72 having a conventional three-way incandescent lamp socket 74. With light fixture 72 mounted to a ceiling surface 76, or the like, socket 74 may be wired using conventional cable 78 with a wall-mounted dimmer switch 44' and ballast circuit 42'. Ballast circuit 42' may be combined in the same housing with dimmer switch 44' and be connected using conventional wiring techniques with the 120/240 volt house power grid. Because the interconnections from dimmer switch 44' to light fixture 74 requires two hot lines and one return, or ground, line, conventional Romex cable, or the like, may be used. In this manner, special cable avoided. The same principle may be used to supply power to multiple lamp assemblies 10, all wired in electrical parallel with each other on a conventional track lighting track (not shown).

Ballast circuit 42 includes a full wave rectifier bridge 78 that produces, from a 120 VAC source, a 160 DC power source at output 80 that is applied across a filtered capacitor 82 (FIG. 5). Output 80 is applied through a bias resistor 84 to a junction 86. Junction 86 is connected through a break-over device, or diac 88 to a junction 90. A resistor 92 extends between junction 90 and the gate 94 of a switching device 96. Junction 90 additionally connects with a terminal of a transformer winding, designated TRA, whose other terminal connects with a junction 98. Junction 98, in turn, connects with a transformer winding TRP whose other terminal 100 is connected through a capacitor 102 to output contact 50.

Junction 98 additionally connects through opposite polarity back-to-back zener diodes 104 and 106 to gate 94. In the illustrated embodiment, switching device 96 is a field effect transistor (FET) whose source is connected with junction 98 and whose sink is connected with junction 108 which is, in turn, connected with output contact 48. Junction 108 is undirectionally isolated from junction 86 by a diode 110 and connects through opposite polarity back-to-back zener diodes 112 and 114 with the gate 116 of a switching device 118. Gate 116 is additionally connected through a resistor 120 to one terminal of a transformer winding TRB whose other terminal connects with junction 108. In the illustrated embodiments, switching device 118 is a FET whose source is connected with junction 108 and whose sink is connected with output 80. Transformer windings TRA, TRB and TRP are commonly wound on a core in a manner that TRP is the primary winding and TRA and TRB are secondary windings with TRA and TRB being wound in an opposing plurality to each other, as indicated by the polarity symbols in FIG. 5.

Bias circuit 42 operates as follows. Upon the application of power thereto, the voltage at junction 86 will conduct a current to junction 90 when the break-over voltage of diac 88 is exceeded. This current will be applied to gate 94 causing switching device 96 to conduct. This will pull output junction 108 low and cause a current to pass through winding TRP. Additionally, a bias will be applied to gate 116 of switching device 118 forcing it into a nonconducting state. The result will be a current induced through winding TRP of a direction tending to induce a voltage across winding TRA of a polarity to force gate 94 low, turning off switching device 96 and inducing a voltage across winding TRB of a polarity forcing gate 116 high, driving switching device 118 into a conducting mode. This causes the output voltage on junction 108 to switch to a positive state and causes a reversal of the current through primary winding TRP. The reversal of current through winding TRP again switches switching device 96 into a conducting state and switches switching device 118 into a nonconducting state. The purpose of zener diodes 104, 106, 112 and 114 are to protect switching device 96 and 118 from excessive voltage peaks.

As three-way switch 44 changes the number of light emitting elements 14 connected to bias circuit 42, the frequency of the square-wave output signal on output conductor 48 is varied as a result of the change in capacitance produced by the different number of light emitting elements which are capacitive devices. Capacitor 102 provides isolation between the electronic components of ballast circuit 42 and light emitting elements 14a-14c and additionally serves to establish a power factor for the circuit as close as possible to unity. The variation in the frequency of the output signal on output contact 48, as a result of switching the number of light emitting elements connected in the circuit, tends to compensate for the change in capacitance from the change in the number of connected elements in a manner that maintains a relatively constant power factor. Thus, bias circuit 42 produces an exceptionally efficient source of excitation for light emitting elements 14 irrespective of the number of such elements being connected to the bias circuit. Capacitors 27a, 27b and 27c across the cathodes 25a-25c and 26a-26c, respectively, provide "instant start" ignition of the light emitting elements 14a-14c by providing current through the cathodes o heat the cathodes to a state where ions are emitted, in order to strike an arc. Instant start ignition circuits are conventional in the art.

While values of components may vary depending upon the power consumption of the particular light emitting elements used, the following is representative of component values that are useful in the illustrated embodiment:

| COMPONENT | IDENTIFICATION NO. |
|---|---|
| Capacitor 82 | 47UF, electrolytic |
| Resistor 84 | 47 K, ohms |
| Diac 88 | 27 volt break-over device manufactured by Diode. Inc., Model RB153 |
| Switching Devices 96 and 118 | Model IRF730 FET |
| Diodes 104, 106 114 and 112 | 1N 47468A Zener |
| Inductive Devices 24a, 24b and 24c | 1300 microhenry. Model IHA-1-01 by Dale Electronics |
| Winding TRP | 5.3 microhenry. 0.01 ohms (1 turn, 30 gage wire) |
| Winding TRA and TRB | 594 microhenry, 0.17 ohms (20 turns, 33 gage wire) |
| Resistors 92, 120 | 120 ohms |

In the illustrated embodiment, light emitting elements 14 are type PL miniature fluorescent lamps of the type manufactured by Osram, although other conventional lamp configurations may be utilized, as illustrated in FIG. 6. Although the invention was described with respect to three light emitting elements 14, a greater or lesser number of elements may be used. Additionally, various elements of the illustrated embodiment may be useful in various configurations. For example, lamp assembly 10 and ballast circuit 42 may be advantageously used to provide exceptional light output and an ability to continue to produce light, notwithstanding the failure of one or more of the light emitting elements. These advantages may be obtained without the use of switch assembly 44.

Accordingly, it is seen that the present invention provides a unique lamp assembly and a lamp system using such lamp assembly. The system provides, for the first time, a practical dimming capability for compact fluorescent lamps and does so in a manner that takes advantages of the features of conventional incandescent lamp fixtures. Specifically, dimming capabilities for compact fluorescent lamps is provided by adapting a three-way lamp fixture, of the incandescent variety by plugging an adapter element into a conventional wall outlet with the incandescent lamp fixture being plugged into the adapter element. Not only does this provide dimming capabilities, but the isolation of the ballast circuit from the lamp assembly avoids a significant detriment to longevity of such compact fluorescent lamps, namely, deterioration as a result of the heat generated by the ballast circuit. Because the ballast circuit is physically removed from the lamp socket, its heat does not affect the lamp assembly. Furthermore, a ballast circuit is disclosed which is exceptionally efficient and, accordingly, does not generate an excessive amount of waste heat. The invention further provides, for the first time, practical dimming capability for recessed lighting and track lighting systems.

Changes in modifications in the specifically described embodiments can be carried out without departing from the principles of the invention, which is intended to be limited only by the scope of the appended claims, it is interpreted according to the principles of patent law including the doctrine of equivalents.

The embodiments of the invention in which as exclusive property or privilege is claimed are defined as follows:

1. A compact low-pressure gas discharge lamp system comprising:
    a lamp assembly including a plurality of low-pressure gas discharge light generating elements each of said light generating elements capable of being individually energized and supply means for making electrical connection to each of said light generating elements;
    a ballast circuit adapted to supplying electrical energy to a selective number of said light generating elements; and
    a switch assembly adapted to connecting said ballast circuit selectively to particular ones of said light generating elements through said supply means, wherein said ballast circuit includes an oscillator that oscillates at a frequency that varies as a function of the number of light generating elements connected by said switch assembly and said supply means to said ballast circuit.

2. The lamp system in claim 1 wherein said switch assembly has progressive switch positions that connect said ballast circuit to an increasing number of light elements for successive ones of said switch positions.

3. The lamp system in claim 2 wherein said switch assembly is a three-way lamp switch.

4. The lamp system in claim 2 wherein said supply means conducts electrical energy to one of said light generating elements in a first switch position of said switch assembly, to two of said light generating elements in a second switch position of said switch assembly, and to three of said light generating elements in a third switch position of said switch assembly.

5. The lamp system in claim 4 wherein said two of said light generating elements does not include said one of said light generating elements.

6. The lamp system in claim 1 wherein said switch assembly is a three-way lamp switch.

7. The lamp system in claim 1 wherein each of said light generating elements includes at least one elongated tube adapted to being illuminated along substantially the entire length thereof and said light generating elements are positioned on a base with said tubes being in a bundle of parallel tubes.

8. The light assembly in claim 1 wherein said supply means includes an inductive device connected with each of said light generating elements.

9. A compact low-pressure gas discharge lamp system comprising:
    a ballast circuit operative from a source of high voltage for supplying electrical energy to a variable number of low-pressure gas discharge light generating elements;
    a three-way switch having an input connected with said ballast circuit and two outputs, wherein said switch connects one of said outputs with said ballast circuit in a first switch position, the other one of said outputs with said ballast circuit in a second switch position and both of said outputs with said ballast circuit in a third switch position;
    a lamp assembly including a plurality of compact gas discharge light generating elements capable of being individually energized and a plurality of inductors, each for conducting electrical energy to one of said light generating elements, wherein one of said inductors electrically connects a first one of said light generating elements to one of said outputs and another of said inductors electrically connects at least one other of said light generating elements to the other one of said outputs;
    wherein said three-way switch selectively connects one or more of said inductors in said ballast circuit in order to supply electrical energy to illuminate the light generating elements connected with the ballast circuit; and
    wherein said ballast circuit includes an oscillator that oscillates at a frequency that varies as a function of the number of light generating elements connected by said switch to said ballast circuit.

10. A compact low-pressure gas discharge lamp adapter for use with a conventional incandescent lighting system including an incandescent lamp socket and a three-way switch connected with said lamp socket comprising:
    a lamp assembly including a plurality of low-pressure gas discharge light generating elements capable of being individually energized and supply means including a contact assembly adapted to engaging an incandescent lamp socket for making electrical connection to each of said light generating elements;
    a ballast circuit adapted to being powered from a high voltage electrical power source and supplying electrical energy to a variable number of low-pressure gas discharge light generating elements, said ballast circuit including means for conducting said electrical energy through the three-way switch of a conventional incandescent lighting system and thereby to the incandescent lamp socket of said lighting system; and
    wherein said ballast circuit includes an oscillator that oscillates at a frequency that varies as a function of the member of light generating elements connected by the three-way switch assembly to the ballast circuit.

11. The lamp system in claim 10 wherein said ballast circuit is enclosed in a housing having contact means for engaging a source of high voltage electrical power and wherein said means for conducting includes a receptacle that is adapted to receiving a lamp plug.

12. The lamp system in claim 10 wherein said means for conducting is capable of conducting said electrical energy over a pair of electrical conductors.

* * * * *

UNITED STATES PATENT AND TRADEMARK OFFICE
CERTIFICATE OF CORRECTION

PATENT NO. : 5,309,062
DATED : May 3, 1994
INVENTOR(S) : Rick A. Perkins and Brian P. Geary It is certified that error appears in the above-indentified patent and that said Letters Patent is hereby corrected as shown below:

> Column 3, line 48:
> "--et" should be --set--.
>
> Column 4, line 17:
> "contact 3" should be --contact 30--.
>
> Column 4, line 27:
> After "emitting" insert --elements 14a-14c.
> As will be set forth in more detail--.
>
> Column 5, line 39:
> Before "core" insert --ferrite--.
>
> Column 6, line 22:
> "o heat" should be --to heat--.

Signed and Sealed this

Sixth Day of December, 1994

Attest:

BRUCE LEHMAN

Attesting Officer      Commissioner of Patents and Trademarks